J. E. PITTMAN.
HANDLE.
APPLICATION FILED MAY 25, 1918.
1,294,304.
Patented Feb. 11, 1919.
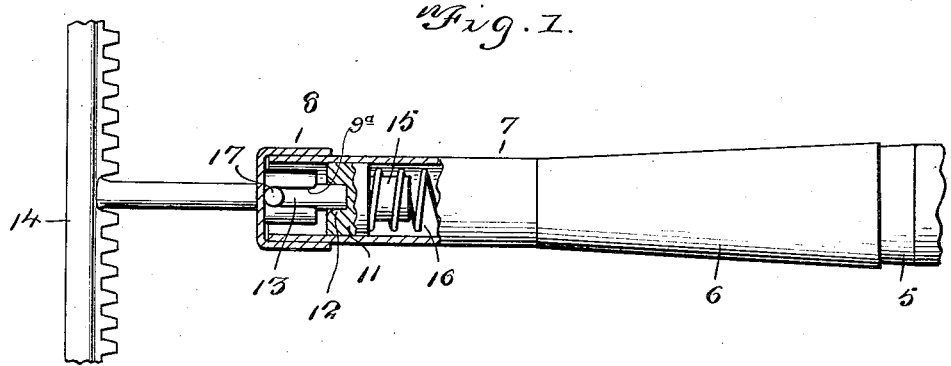
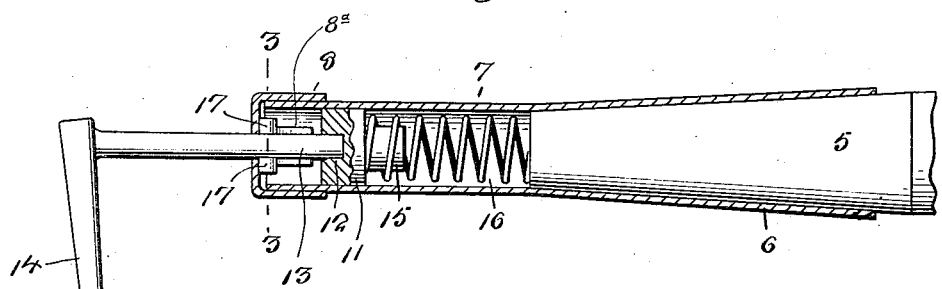
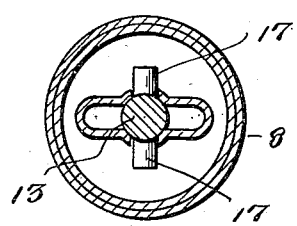
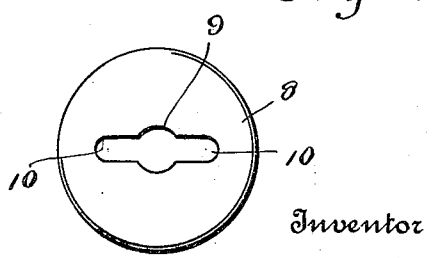
Inventor
J. E. Pittman
By Victor J. Evans
Attorney
Witnesses
E. R. Ruppert

UNITED STATES PATENT OFFICE.

JAMES E. PITTMAN, OF NEDERLAND, COLORADO.

HANDLE.

1,294,304.

Specification of Letters Patent.

Patented Feb. 11, 1919.

Application filed May 25, 1918. Serial No. 236,621.

*To all whom it may concern:*

Be it known that I, JAMES E. PITTMAN, a citizen of the United States, residing at Nederland, in the county of Boulder and State of Colorado, have invented new and useful Improvements in Handles, of which the following is a specification.

This invention relates to handles, particularly to handles for rakes, hoes and other garden implements, and has for its object the provision of a handle structure wherewith may be conveniently associated a rake, hoe, shovel, or other implement used in gardens, the handle being so constructed that these various implements may be firmly and conveniently associated therewith.

An important object is the provision of a device of this character comprising a handle member including spring retaining means whereby the shanks of various implements may be readily applied thereto and firmly held in operative position.

Another object is the provision of a handle of this character which will be extremely simple and inexpensive in manufacture, highly efficient and durable in service, and a general improvement of the art.

With the above and other objects and advantages in view the invention consists in the details of construction to be hereinafter more fully described and claimed and illustrated in the accompanying drawing in which:—

Figure 1 is a side elevation of my handle having a rake applied thereto in operative position.

Fig. 2 is a vertical longitudinal sectional view.

Fig. 3 is a cross sectional view on the line 3—3 of Fig. 2 and

Fig. 4 is an end view of the handle.

Referring more particularly to the drawing the numeral 5 designates the handle proper which may consist of a bar or pole of wood or other desired material and 6 designates the end portion formed as a ferrule secured upon one end of the handle member 5. This ferrule member 6 is provided at one end with a reduced portion 7 which is cylindrical and which has engaged upon its end a cap 8 the outer end of which is closed and provided with a circular opening 9 with which communicate lateral openings 10 constituting a key hole slot. Extending inwardly from the closed end of the cap 8 is a tubular extension 8ª provided with slots 9ª at right angles to the openings 10.

A retainer member 11 is disposed within the cylindrical portion 7 of the ferrule and is provided at its outer face with a circular recess 12 adapted to receive the shank 13 of an implement or tool 14, as shown. The member 11 is provided upon its rear face with a cylindrical projection 15 about which is disposed a coil spring 16 which abuts against the end of the handle member 5.

The shank 13 of the tool or implement 14 is provided with oppositely extending lugs 17 which are of a size and shape to pass within the openings 10 in the end 8 of the cylindrical member 7, and to be engaged within the slots 9ª.

The operation of the device is as follows: The shank 13 of the implement 14 is passed through the opening 9 in the cap 8 and is so positioned that the lugs 17 will be disposed in registration and passed through the lateral openings 10. When the lugs are so disposed, the implement or tool 14 is pushed into the handle member with the end of its shank 13 disposed within the opening 12 in the member 11. This action compresses the spring 16 and allows the shank 13 to be moved inwardly in respect to the handle until the lugs 17 pass inwardly beyond the end of the extension 8ª of the cap. After this is done, the handle member is given a quarter turn and pressure upon the shank of the implement is released whereupon the action of the spring 16 will cause the member 11 to force the shank 13 of the implement outwardly until the lugs 17 engage within the slot 9ª in the extension 8ª. The implement will thus be held firmly in position for use.

In order to release the implement from engagement with the handle, it is merely necessary to press upon the implement so that the member 11 will be moved rearwardly into the handle in opposition to the spring 16 until the lugs 17 are clear of the slots 9ª, after which the handle is given a substantially quarter turn to bring the lugs in registration with the openings 10, whereupon relieving pressure upon the end of the implement will result in the spring 16 forcing the shank 13 of the implement outwardly until the lugs 17 are disposed entirely beyond the end wall of the cap 8. The implement may then of course be readily withdrawn from association with the handle.

From the foregoing description and a study of the drawings it will be apparent that I have thus provided a handle structure with which may be conveniently and readily associated various implements such as rakes, hoes, shovels, and other devices which have their shanks provided with laterally extending lugs engageable with certain portions of the handle member whereby the different implements may be associated therewith and held firmly in position therewith.

Having thus described the invention what I claim is:—

A handle structure comprising a pole, a ferrule member secured upon one end thereof, a cap on the open end of said ferrule and having its closed end provided with a central opening with laterally extending openings communicating therewith and constituting a key-hole slot, an inwardly extending tubular extension on the closed end of said cap concentrically of the central opening therein and provided with longitudinally extending slots arranged at right angles to said laterally extending openings, an outwardly spring pressed block slidable in said ferrule, in combination with a tool shank insertible through the central opening in the closed end of said cap and engageable with said block, and laterally extending lugs on said shank passable through the lateral openings in the cap and engageable within the slots in said extension when said shank is given a partial rotation.

In testimony whereof I affix my signature.

JAMES E. PITTMAN.